United States Patent [19]

Anello et al.

[11] Patent Number: 5,526,412
[45] Date of Patent: Jun. 11, 1996

[54] DIAL ASSEMBLY TERMINALGARD

[75] Inventors: Salvatore Anello, Highland; Albert F. Diaz, Lynbrook; Nathan M. Turk, Highland, all of N.Y.

[73] Assignee: Sandt Technology, Ltd., Marlboro, N.Y.

[21] Appl. No.: 231,500

[22] Filed: Apr. 22, 1994

[51] Int. Cl.⁶ .......................... H04M 17/00; H04M 9/00; H04M 1/00
[52] U.S. Cl. .......................... 379/145; 379/143; 379/150; 379/437; 379/451
[58] Field of Search ..................................... 379/143, 145, 379/437, 451, 150

[56] References Cited

U.S. PATENT DOCUMENTS

| | | | |
|---|---|---|---|
| 4,700,384 | 10/1987 | Meyer | 379/437 |
| 5,007,079 | 4/1991 | Vogl | 379/145 |
| 5,018,193 | 5/1991 | DeArkland | 379/145 |
| 5,054,056 | 10/1991 | Blythe | 379/145 |
| 5,128,993 | 7/1992 | Skowronski | 379/437 |
| 5,131,035 | 7/1992 | Ohayon | 379/437 |
| 5,146,492 | 9/1992 | Stone | 379/145 |
| 5,291,981 | 3/1994 | Anello | 379/145 |
| 5,315,654 | 5/1994 | Kraft | 379/437 |

Primary Examiner—Stephen Chin
Assistant Examiner—Vijay Shankar
Attorney, Agent, or Firm—Joseph B. Taphorn

[57] ABSTRACT

A telephone is secured against vandalism involving inserting a bare electrically conductive wire through the slot in the MEDECO lock securing the upper housing to the main housing. The free end of the inserted wire is made to contact either the "12" or the "1" terminal on the key pad on the back of the dial housing, to place system ground on the relay controlling the coin switch at the bottom of the chute for inserted coins and neutralize it so that coins can not be released to the coin box if a call is completed nor to the coin return bucket if a call is not completed. An advantageously shaped and located and mounted wire guard prevents the vandalism. The thin guard includes a wire blocking portion, a flange mounting portion, and intermediate portion connecting the blocking and mounting portions, and an inturned portion on its free end for overlying the terminals.

14 Claims, 5 Drawing Sheets

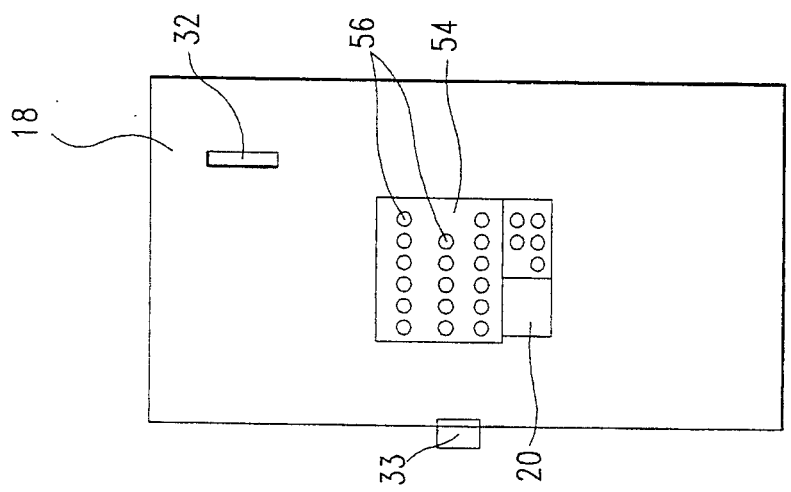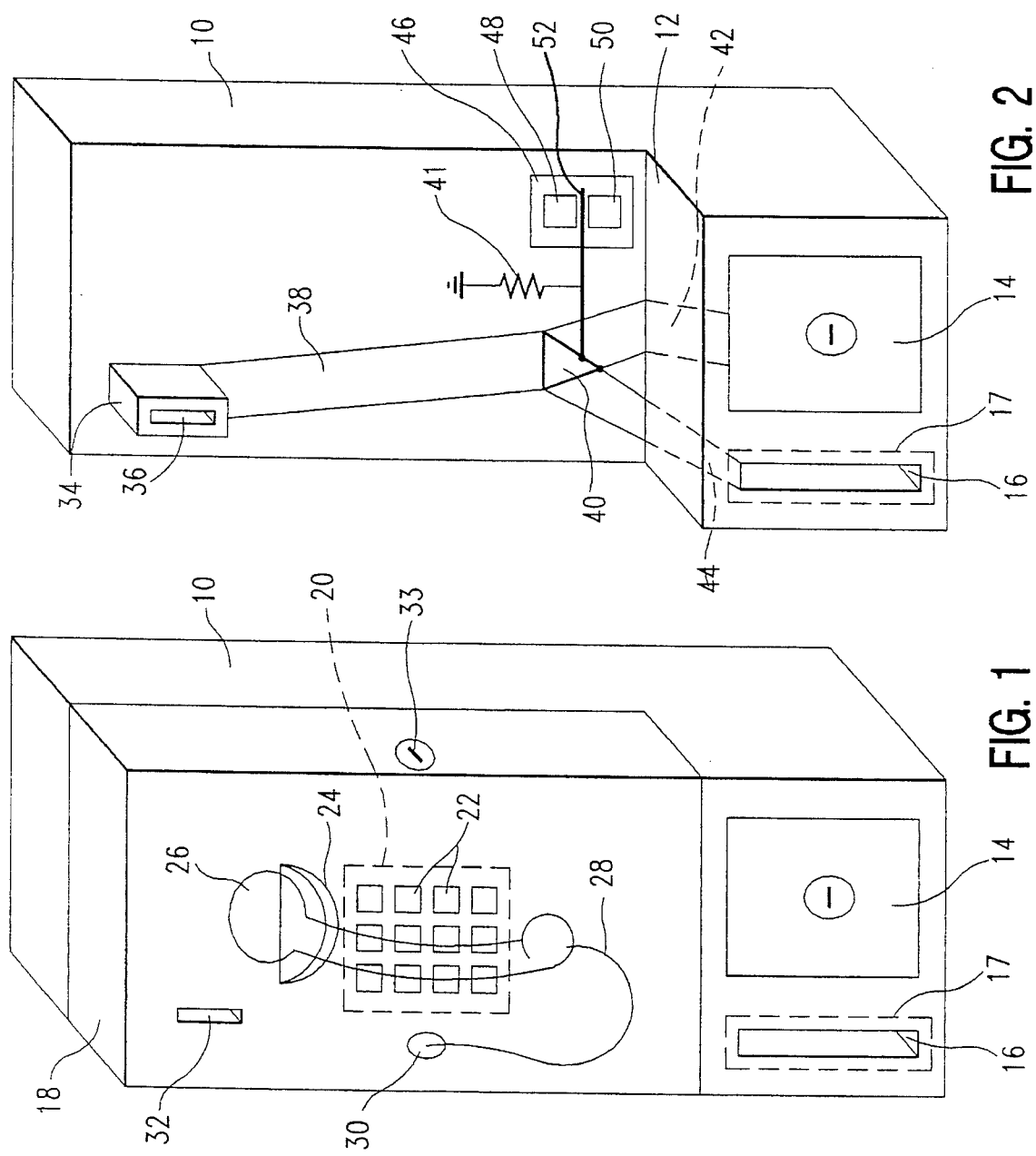

DIAL ASSEMBLY TERMINALGARD

FIELD OF THE INVENTION

This invention relates to coin-operated-telephone security devices and methods, and more particularly to a security device and method that protects a coin operated telephone from having its coin switch relay grounded.

BACKGROUND OF THE INVENTION

Vandalism of coin-operated public-pay telephones is one of the biggest problems facing public and private telephone companies. Pay phones are exposed day and night to professional and amateur criminals who find the significant sums of money collected therein on a continuous basis, a serious temptation. The exposed and isolated nature of pay phone installations renders the vandalism acts relatively safe for the criminal.

A coin pay telephone includes a coin return assembly or bucket to which normally a would-be caller's money is returned when his or her call is not completed, as when the called number is busy. Vandals have discovered that all coins deposited in a telephone, for both completed and not completed calls, can be sent to the coin return bucket via the relay controlling the coin switch which normally directs inserted coins to either the coin return bucket or to the telephone coin box. They achieve this by grounding the coin switch relay to neutralize it, and leaving the ground in place.

The coin switch in its closed position holds up the coins deposited by the telephone user; when moved to one open position, as when a call is completed, it directs the just-deposited coins being held in a chute, to the coin box; however, when moved to the other open position, as when a call is not completed, it directs the just-deposited coins to the coin return bucket for picking up by the would-be caller.

A coin pay telephone also includes a key pad on the back of he dial housing having twelve push buttons extending through the front of the telephone upper housing for depressing according to the number to be called. The key pad mounts on its rear, numbered terminals for effecting electrical connections according to the push buttons pushed. The wiring between each of the key pad terminals numbered 1 and 12 and the coin switch relay, is such that when either of them is placed at system electrical ground, the relay is grounded and placed in a neutralized condition and the coin switch goes to closed position to which it is biased and remains there to hold up all coins inserted for both completed and not completed calls. Inserted coins cannot thereafter be passed on to the telephone coin box nor to the coin return bucket, though telephone calls can be both attempted and completed. Telephone users completing their calls will not notice the difference.

One way vandals ground the coin switch relay is by inserting a bare wire through the MEDECO lock (upper housing lock located on the left side of the upper housing and opposite the key pad terminal) which has a out slot through its cylinder, and touching one of key pad terminals numbered 1 or 12. This applies the system ground on the housing to the touched terminal which neutralizes the relay and allows the coin switch to assume the closed position in which it holds up all subsequently deposited coins, those for both completed and not completed calls. Pay telephone users are thus deprived immediately of their monies inserted for unsuccesssful calls; the telephone company eventually does not collect its monies for services rendered in completing calls and that it normally picks up on a regular schedule.

Before the regular-schedule pick-up time, the vandal returns to retrieve the coins deposited in the meantime. He first removes the ground to one of the key pad terminals numbered "1" or "12". He then goes "off-hook", and immediately hangs up. The coin operated telephone now works as it should, and "return current" comes out to the coin telephone from the "central office". The "return current" operates the coin switch relay to return it to the other open position in which it allows all coins to move under the influence of gravity to the coin return bucket. All of the coins, for both incompleted and completed calls, which were deposited during the period the coin switch relay was grounded, will now be available to the returning vandal who rifles the coin return bucket for its contents. The ground may now be reapplied, or it may be left off until after the next telephone company collection visit to allow the collection of a few coins in the telephone coin box and not alert the company to the fraud being practiced.

Thus both the unsuccessful callers and the phone company are defrauded of their rightful monies. In addition, the phone company is subjected to the ill will of unsuccessful callers who don't recover their coins.

SUMMARY OF THE INVENTION

Accordingly, it is an object of the invention to insure that coin-operated public pay telephones can freely operate in their expected manner.

Another object of the invention is to insure that coins inserted for pay telephone calls that are not completed, are available to the would-be caller for retrieval.

Still another object of the invention is to save for the telephone company the coins that rightfully belong to it.

Yet another object of the invention is to improve the earnings of telephone companies so that rates for all legitimate users may be lowered.

A more particular object of the invention is to protect coin-operated pay telephones from subversion by vandalism.

A still more specific object of the invention is to prevent the grounding of the coin switch relay by a wire inserted through the slot in the cylinder of the MEDECO lock for the upper housing of the coin-operated public pay telephone.

A related object of the invention is to protect the telephone company from the ill will of unsuccessful telephone callers whose coins were not returned.

A still further object of the invention is to encourage the installation of pay telephones in high crime areas.

Yet another object of the invention is to encourage the installation of pay telephones in poor or ghetto areas where individual or family phones are a rarity.

An additional object of the invention is to provide a simple and easy protection against such wire vandalism, and one that is inexpensive.

The objects of the invention are achieved by creation of a terminal guard and mounting of it on the existing dial housing of a coin-operated public pay telephone to protect the "1" and "12" key pad terminals from grounding by metallic objects inserted through the slot of the MEDECO lock Cylinder, The terminal guard is a configured sheet of material which is secured at its forward portion to the side of the dial housing. A portion blocking any wire inserted through the lock slot may be offset from the forward portion to free up a maximum of space for general service of the telephone, The rear portion of the guard may be inturned to extend behind the back of the key pad terminals "1" and "12" and prevent any wire bent after being inserted through the lock slot from reaching one of the terminals "1" and "12".

A feature of the invention is that it can be fit easily into the existing structure of a coin-operated pay telephone, and mounted using existing screw holes in the side of the dial housing.

An advantage of the invention is that it is inexpensive to manufacture and easily installed.

BRIEF DESCRIPTION OF THE DRAWINGS

These and other objects, features, and advantages of the invention will become apparent from a reading of the description of a preferred embodiment of the invention, when considered with the apended drawings wherein:

FIG. 1 is a perspective diagrammatic view of the front and right (as being viewed) side of a coin telephone such as the 1D2 set of the Bell regional telephone companies;

FIG. 2 is a like view of the coin telephone of FIG. 1 but with the upper housing removed and showing coin chutes and a coin switch and controlling relay on the main housing;

FIG. 3 is a diagrammatic orthogonal rear view of the removed upper housing of FIG. 1 and showing the terminals on the rear of the key pad and the Medeco lock for securing the upper housing to the main housing;

DETAILED DESCRIPTION OF A PREFERRED EMBODIMENT OF THE INVENTION

Figure 4:
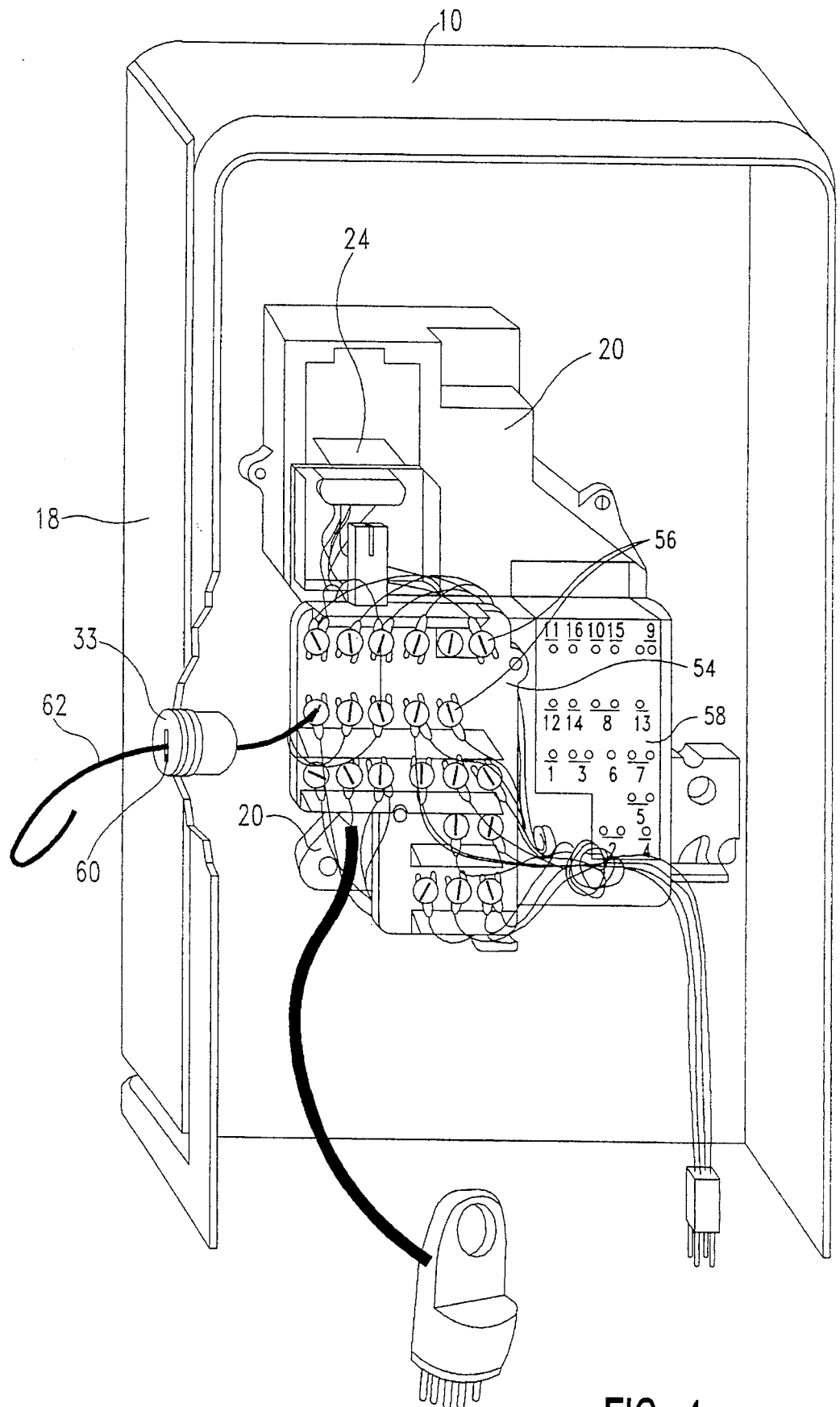
FIG. 4 is a view in perspective from the rear, with parts of the main and upper housing broken away, of the inside of a standard coin-operated pay telephone and showing the rear of the key pad terminal, the Medeco lock for securing the upper housing on the main housing, the cable and plug connected to a receiver, and the cable and plug for connection to the relay and other instrumentalities of the telephone main housing and via telephone lines to the "central office" for the transmission of signals and power including return current; and also showing a vandal wire inserted through the slot in the Medeco lock and grounding the 12 terminal on the key pad.

A standard Bell regional coin telephone or station known as the 1D2 is shown in FIGS. 1–3. It includes a main housing 10 having in its bottom below a horizontal plate 12, a coin box 14 for securely holding coins collected for completed telephone calls, and a coin return slot 16 via which ordinarily only coins being returned to the user for calls not completed are retrieved from the coin return assembly or bucket 17. It also includes in front an upper housing 18 for the upper front half of the telephone.

The upper housing 18 mounts on the inside near the middle of its front, the dial housing 20. The dial housing mounts the twelve pushbuttons 22 used for "dialing" in TOUCH-TONE "dial" types. The upper housing 18 pivotally mounts above the push buttons 22, an upwardly biased hook 24 normally held down by a receiver 26. The receiver 26 is connected to the inside of the housing 18 via a flexible cable 28 passing through a hole 30 in the housing 18. A would-be telephone user lifts the receiver 26 off the hook 24 which then moves upwardly under its bias to close a circuit which alerts the "central office" to which it is connected by wires, that a connection is planned; the central office then sends a "return current" to the telephone enabling dialing connection to be made.

A vertical slot 32 in the upper left corner of the front of the upper housing 18 accommodates coin insertion to operate the telephone by the caller, A MEDECO lock 33 carried by the right (FIG. 1) side of the upper housing 18, releasably secures the upper housing 18 to the main housing 10.

That portion of the main housing 10 constituting the upper rear half of the telephone, mounts on its upper left hand corner of its front face (FIG. 2) a coin guide and sensing box 34. The coin guide box 34 includes a vertical slot 36 which, in the mounted position of the upper housing 18, is juxtaposed behind the vertical slot 32 in the upper housing 18 so that a coin inserted in the latter will enter it and travel down the guide box 34 to a vertical chute 38.

Exit from the lower end of the chute 38 is controlled by a pivoted coin switch 40. In the closed position of the coin switch 40 to which it is biased as by a spring 41, the gravity flow of coins from the chute 38 is blocked. In one open position to which the coin switch 40 may be rocked (to the left in FIG. 2), as when a call is completed, previously blocked coins may flow through a chute 42 to the coin box 14. In the other open position to which the coin switch 40 may be rocked (to the right in FIG. 2), as when a call is not completed, blocked coins may flow through a chute 44 to the coin return assembly or bucket 17 behind the slot 16.

The position of the coin switch 40 is controlled by a relay 46. The relay 46 is shown as having two coils 48 and 50, either of which is effective when energized to attract the free end of a lever 52 secured to the rockable coin switch 40. When the upper coil 48 is energized, the free end of the lever 52 is raised to rock the coin switch 40 counterclockwise to where coins trapped in the chute 38 flow to the coin box 14. On the other hand, when the lower coil 50 is energized, the coin switch 40 is rocked clockwise to where coins trapped in the chute 38 flow to the coin return bucket 17.

Operation of the coin switch relay 46 is controlled from a terminal pad 54 (FIG. 3) mounted on the rear of the dial housing 20. The pad 54 bears terminals 56 which are electrically interconnected with switches operated by the push buttons 22, by the receiver hook 24, by the coin sensors in coin guide and sensing box 34, and by the central office. Two particular terminals, "1" and "12", are so electrically connected to the relay 46 so that when they are placed at system ground, the relay 46 is neutralized and the coin switch lever 52 assumes the neutral position in which the coin switch 40 is in the home or closed position and all subsequently inserted coins are trapped in the chute 38 and from which it can not be moved by other customary electrical signals such as for calls completed arid not completed which are applied to the relay 46.

A vandalism is shown in FIG. 4. FIG. 4 is an enlarged view showing the rear face of the key pad 54 mounted on the rear of dial housing 20. A top and a bottom row of six and an intermediate row of five terminals 56 are arranged across the key pad rear face. An identification sheet 58 glued to an adjacent component, labels the respective terminals. The left hand (FIG. 4) terminals in the middle and lower rows are labeled "12" and "1" respectively, and are electrically connected to the coin switch relay 46 so that when system ground is applied to either, the relay 46 is neutralized and the coin switch 40 is left in coin blocking position from which it can not be moved.

As noted above, the upper housing 18 is held securely onto the main housing 10 by a MEDECO lock 33. The MEDECO lock 53 has a key slot 60 through which a bare wire 62 may be inserted into the housing by a vandal. FIG. 4 shows the terminals "12" and "1" are right opposite the MEDECO lock 33 and insertion of an electrically conductive wire 62 through it's slot 60 positions the free end of the wire to easily engage one of the relay grounding terminals "12" or "1".

The main housing 10 and upper housing 18 and MEDECO lock 33 are electrically conductive and at system ground; hence the bare electrically conductive wire 62 extending through and making contact with the inside of the MEDECO lock slot 60 is at system ground and applies system ground to any terminal 56 it is placed in contact with; when it is placed in contact with either of terminals "12" or "1", system ground is applied to relay 46 to neutralize it and leave the coin switch 40 in closed position. Coins inserted after the relay 46 has been neutralized will allow calls to be completed, but none will be released from the chute 38 whether the call is completed or not.

Figure 5:
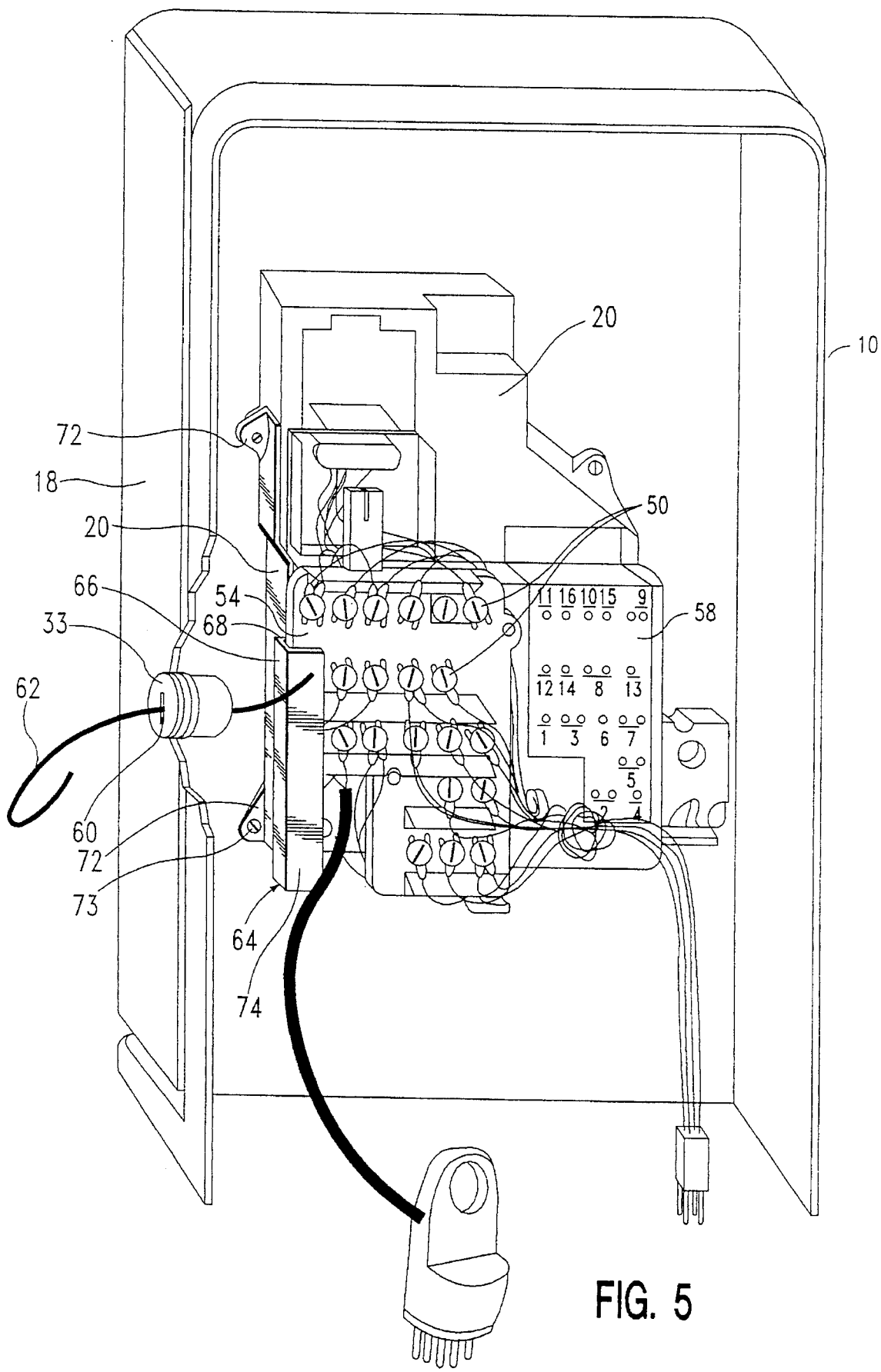
FIG. 5 is a similar view in perspective from the rear of the inside of a standard coin-operated pay telephone altered by mounting a terminal guard on the side of the dial housing and so that it extends backward along side the key pad and opposite the Medeco lock to a line behind the terminals.
Figure 6:
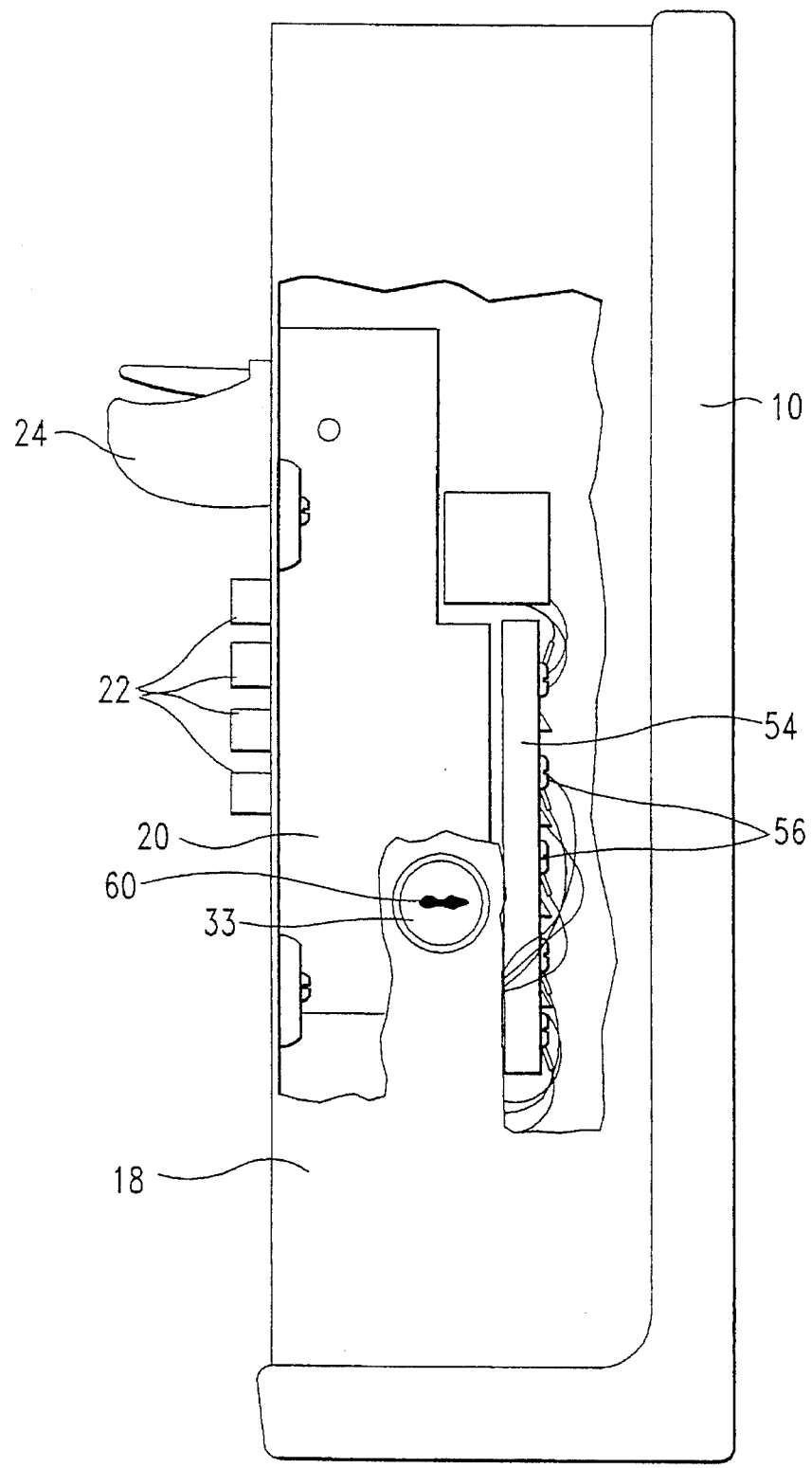
FIG. 6 is a view of the left side of a standard coin-operated pay telephone pin-pointing the location of the Medeco lock with respect to the terminal pad.
Figure 7:
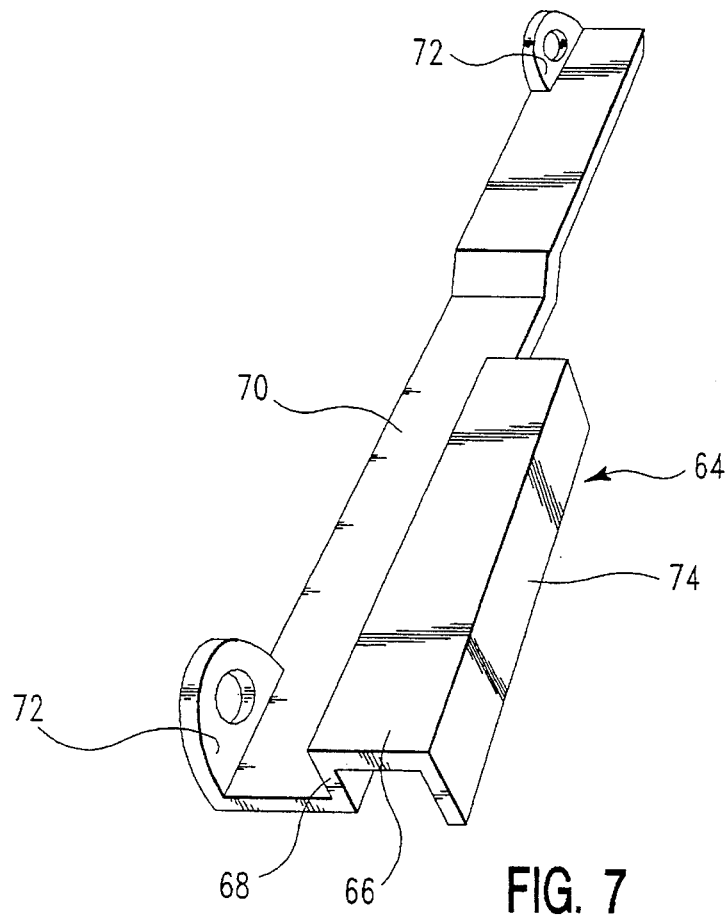
FIG. 7 is a view in perspective of the terminal guard.
Figure 8:
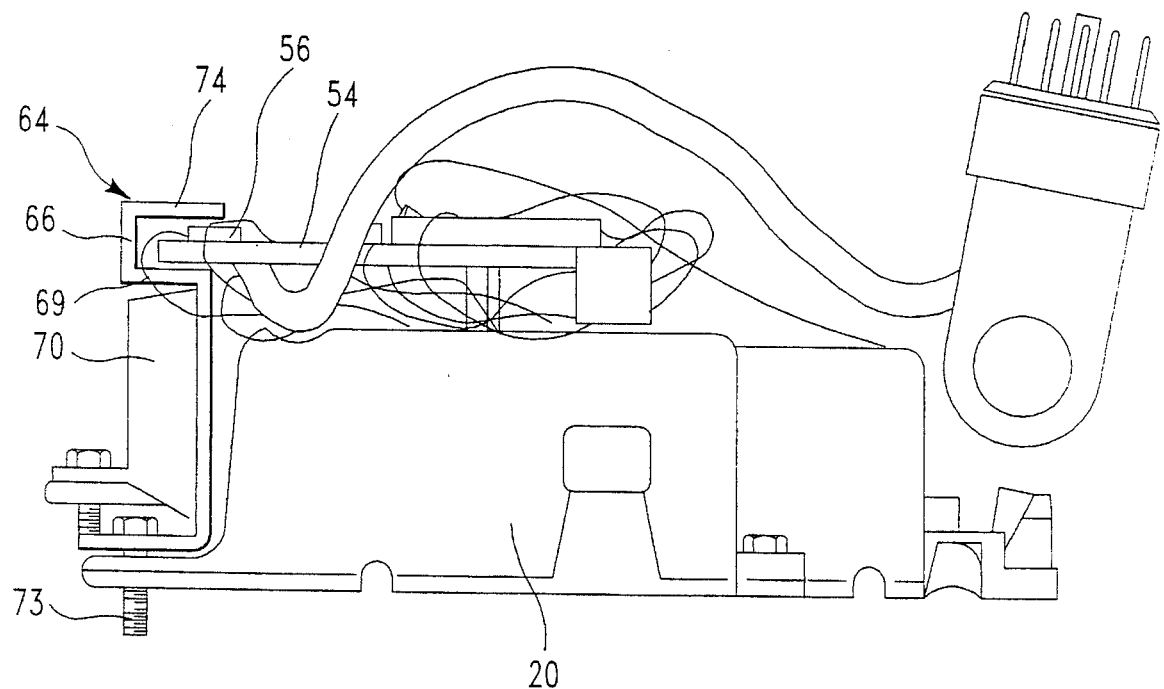
FIG. 8 is a view from below of the installed terminal guard.

The above described vandalism is prevented by the advantageous installation of terminal guard generally indicated by the numeral 64 (FIGS. 5, 7 and 8). The terminal guard is a thin sheet of material such as plastic, molded so as to conform to shape of and the configuration of the left edge (FIG. 5) of the terminal pad 54 with respect to the mounting dial housing 20 and the terminals "12" and "1". It includes a main body or wire blocking portion 66, an intermediate inturned portion 68, and a flange mounting portion 70 of two offset parts respectively provided with lobes 72 with holes for mounting by bolts 73 in existing threaded holes in the left side (FIG. 5) of the dial housing 20. The other or free end of the terminal guard 64 may have an inturned portion 74 for wrapping around the rear of the terminal pad to fully cover the terminals "12" and "1" and protect them from any bends made in the free end of the vandal wire 62 after it was inserted.

When a vandal approaches a coin-operated pay telephone having a terminal guard 64 installed, grounding of either of the coin switch relay neutralizing terminals "12" or "1" will be prevented by the wire 62 inserted through the MEDECO lock slot 60 striking the terminal guard 64 and being deflected away from the terminals "12" and "1". Any bends introduced into the wire will be prevented from contacting either of the terminals "12" and "1" by the terminal guard free end inturned portion 74.

While there has been shown and describe a preferred embodiment of the invention, it will be apparent to those skilled in the art that other and different applications may be made of the principles of the invention. It is desired therefore to be limited only by the scope or spirit of the appended claims.

What is claimed is:

1. In a coin-operated pay telephone for a communications system having an electrical ground, comprising:

a main housing with a coin box, a coin return bucket, a chute for holding inserted coins, a coin switch for directing the inserted coins to either the coin box or the coin return bucket accordingly to whether a call was completed or not, and a relay for controlling the coin switch and possessing a neutralized condition in which the switch blocks the coin chute; and an upper housing mounting a terminal key pad whose terminals are electrically connected to the relay and which when system ground is placed on any one of them neutralize the relay, and mounting a lock for securing it to the main housing and formed with a slot extending through it and through which slot a bare conductive wire may normally be inserted by a vandal to ground a key pad terminal;

and a wire guard secured in the available space between the lock and the key pad terminals to block any inserted vandal wire from reaching any one of the terminals and applying system ground to it.

2. A pay telephone according to claim 1, wherein the pay telephone has a key pad in the upper housing and the terminal pad is the key pad.

3. A pay telephone according to claim 1, wherein the pay telephone has a dial housing in the upper housing and the wire guard is mounted on the dial housing.

4. A pay telephone according to claim 3 and the dial housing mounts push buttons on its front side.

5. A pay telephone according to claim 1, wherein the pad has several terminals and the terminals which neutralize the relay are the "12" and "1" terminals.

6. A pay telephone according to claim 5, wherein the relay moves the coin switch from a blocking position to one in which inserted coins are permitted to fall to the coin box when a call is completed.

7. A pay telephone according to claim 5, wherein the relay moves the coin switch from a blocking position to one in which inserted coins are permitted to fall to the coin return bucket when a call is not completed.

8. A pay telephone according to claim 3, wherein the wire guard includes a vertical plate portion disposed along the edge of the key pad.

9. A pay telephone according to claim 8, wherein the wire guard has a flange portion by which it is attached to the dial housing.

10. A pay telephone according to claim 9, wherein an inwardly directed intermediate portion connects the vertical plate portion with the flange portion.

11. A pay telephone according to claim 8, wherein the free end of the wire guard is an inturned portion overlying the terminals.

12. A pay telephone according to claim 9, wherein the free end of the wire guard is an inturned portion overlying the terminals.

13. A pay telephone according to claim 10, wherein the free end of the wire guard is an inturned portion overlying the terminals.

14. A pay telephone according to claim 9, wherein the flange portion is formed with holes permitting the insertion of bolts therethrough to be received in existing threaded holes in the dial housing.

\* \* \* \* \*